United States Patent [19]

Chou

[11] Patent Number: 5,352,295
[45] Date of Patent: Oct. 4, 1994

[54] ROTARY VANE ENGINE

[76] Inventor: Yi Chou, No. 3, Building 57, Ganjingzi District, Dalian, Liaoning Province, China

[21] Appl. No.: 59,837

[22] Filed: May 10, 1993

[30] Foreign Application Priority Data

May 16, 1992 [CN] China .................. 92103705

[51] Int. Cl.$^5$ .................................. F02B 53/00
[52] U.S. Cl. .................................. 123/236
[58] Field of Search ............... 123/236, 243; 418/138, 418/241

[56] References Cited

U.S. PATENT DOCUMENTS

| 1,306,699 | 6/1919 | Johanson | 123/236 |
| 3,921,597 | 11/1975 | Franco | 123/228 |

FOREIGN PATENT DOCUMENTS

| 455884 | 6/1913 | France | 123/236 |
| 710884 | 6/1931 | France | 123/236 |
| 104504 | 8/1980 | Japan | 123/236 |
| 276959 | 10/1964 | Netherlands | 123/243 |

*Primary Examiner*—Michael Koczo
*Attorney, Agent, or Firm*—William F. Pinsak

[57] ABSTRACT

This invention relates to a combined rotary engine with an eccentric rotor and a single vane. The engine comprises at least a set consisting of a compressing portion and a working portion with similar structure combined side by side, and sharing a common output shaft. The gas is sucked into the compressing portion to be compressed, and is then translated to the adjacent working portion to ignite for working. The features of the engine are that power is translated out by the output shaft driven by the vane directly, wear is low, the adjacent compressing portion and working portion may have optimum volume ratio, the utilization of energy is high and oiling and cooling are executed easily.

9 Claims, 3 Drawing Sheets

ROTARY VANE ENGINE

BACKGROUND OF THE INVENTION

This invention relates to a combined rotary vane engine, particularly to a rotary engine with a single vane and a biased rotor.

In the prior art, three typical structures of rotary engine are: a rotary engine with vane(s), a rotary engine with engagement of toothed gears or the like, and a rotary engine with oscillating motion. Additionally, the rotary engine with vane(s) has many variations, one of which is a rotary vane engine with an eccentric rotor, to which this invention is directed.

The main structural features of such an engine are as follows: the cylinder is of cylindrical shape; a shaft is provided at the axis passing the center of the cylinder; a vane rotating around the axis is disposed radially between the axis and the internal wall of the cylinder; a hollow cylindrical rotor with a longitudinal slot is located eccentrically in the cylinder around said center shaft, and the external wall of the rotor is tangential to the internal wall of the cylinder; a combustion chamber, the volume of which changes with the rotation of the vane, is formed between the external wall of the rotor and the internal wall of the cylinder so as to execute the working cycle of the internal combustion engine. Such an engine may have a vane or a plurality of vanes, as disclosed in, e.g., U.S. Pat. Nos. 3,132,632, 2,969,049 and 3,289,653.

Up to now the rotary engine is not widely used in practice because it has serious deficiencies and cannot realize the requirement for simple, reliable and highly efficient work. The references mentioned above are taken into account, for example: for such an engine with a plurality of vanes as in U.S. Pat. No. 3,132,632, the angles between said vanes are varied during operation, so that these vanes cannot be all fixed on the center shaft. Therefore, power output is realized by function of the vanes which move the eccentric rotor. Under the mutual action between the great pressure, which is produced during explosion of the combustion gas, and the load, a great stress may be caused between the vanes and the slot from which the vane projects, thus causing the slide or sealing member to quickly wear out. As a result, the whole engine fails.

For such an engine with a single vane, as disclosed in U.S. Pat. Nos. 2,969,049 and 3,289,653, although the power output mode in which the vane is fixed with the center shaft is used, there exist some obvious deficiencies. First, it is necessary for the engine of U.S. Pat. No. 2,969,049 to provide a set of special mechanisms to drive the .eccentric rotor and the vane to execute the working cycle. Therefore, the eccentric rotor rotates on the internal wall of the cylinder by the action of the drive means, thus the structure is complicated, and it is difficult to achieve the seal and lubrication. Moreover, during operation, a great stress may be produced between the vane and the rotor, thus causing the sealing member to wear out, causing the whole engine to fail.

Additionally, both of the above-mentioned technical solutions have another similar deficiency. That is, since the working space of the engine is crescent and limited, it is difficult for the energy of the combustion gas by the explosion stroke to be used efficiently while rotating at a high speed (the explosion angle of rotation being less than 180° of the rotation angle of the vanes), and the compression stroke is equal to the explosion stroke, which leaves surplus energy to be discharged, thus wasting energy and lowering efficiency.

Moreover, there exist the following deficiencies in the technical solution of U.S. Pat. No. 3,289,653:

1. The structure is unreasonable. Since the working mode in which the internal cylinder is for suction and compression, and the external cylinder is for combustion and action, it is difficult to realize an optimum ratio of working volumes;

2. A high sealing requirement is needed between the front and the back of the vanes, both ends of the rotor and the external wall, vane and rotor, so that the sealing is complicated and difficult, and reliability is worse;

3. Since both internal and external cylinders are all working chambers, effective lubrication and cooling is not provided between the chambers or in the chamber;

4. Because a very long compression gas pipe is provided between the compression cylinder and the working cylinder, the exhaust gas produced in combustion cannot be fully discharged out in the discharge stroke, thus lowering the combustion efficiency;

5. Gas passage is opened and closed by a disk turning valve, the structure is complicated and reliability is worse.

SUMMARY OF THE INVENTION

An object of this invention is to provide a combined rotary vane engine simple in structure and reliable in operation. Another object of this invention is to provide a combined rotary vane engine in which lubrication and cooling can easily be accomplished.

A further object of this invention is to provide a combined rotary vane engine with high energy utilization.

The objects of the invention are realized by the following technical solution. According to the invention, there is provided a combined rotary vane engine comprising at least a compressing portion, at least a working portion, an ignition system, a lubricating system and a cooling system, characterized in that:

A. Said working portion comprises at least a cylinder, an output shaft provided on an axis of the cylinder and extended to the compressing portion, a single vane secured on the output shaft and extended radially of the internal wall of the cylinder, a hollow cylindrical eccentric rotor provided between the output shaft and the cylinder and biased relative to the axis of the cylinder and supported on the side wall of the cylinder by bearings and being rotatable about the axis of the rotor, the section of the internal wall of the said cylinder in contact with the rotor forms an arc which is identical to the external wall of the rotor and forms sealed areas, the cross-section which is provided at the said rotor adjacent to the upstream side of the vane is a triangular combustion chamber. the hollow cylindrical wall of the eccentric rotor being provided with a longitudinally extended opening for the vane to project out, a side which allows the vane to reciprocate relative to the rotor being disposed in the opening;

B. Said compressing portion comprising at least a cylinder adjacent to and coaxial with the cylinder of the working portion, a single vane secured on the portion extended into the cylinder from the output shaft and extended radially to the internal wall of the cylinder in the compressing portion, a hollow cylindrical eccentric rotor provided between the output shaft and the cylinder, and biased relative to the axis of the cylinder and supported on the side wall of the cylinder by bearings and being rotatable about the axis of the rotor, the section of the internal wall of the said cylinder in contact with the rotor forms an arc which is identical to the external wall of the rotor and forms sealed areas, the cross-section which is provided at the said rotor adjacent to the downstream side of the vane is a shallow wedge-like trough. the hollow cylindrical wall of the eccentric rotor being provided with a longitudinally extended opening for the vane to project out, a slide which allows the vane to reciprocate relative to the rotor being provided in the opening; and C. At the wall of the cylinder of the afore-mentioned working portion is installed an exhaust outlet which is interlinked with the end of the space surrounded by the cylinder and the rotor in the direction of rotation while for the wall of the cylinder of the said compressing portion is provided an inlet which is interlinked with the upstream side in the space surrounded by the cylinder and the rotor in he direction of rotation, an interlinked gas passage is installed along the adjacent walls of the cylinder in the sealed area formed by the cylinder and the rotor of the above two portions while a spark plug or an injection nozzle used in the ignition system of the engine is attached to the position adjacent to the downstream side in the direction of rotation inside the wall of the area sealed by the said rotor of the working portion.

The operating volume formed by the cylinder and the rotor of the compressing portion may be less than the corresponding volume of the working portion, in accordance with design requirements.

As compared with the prior art, the present invention has the following advantages because of the above-mentioned structure:

1. Since the eccentric rotors of both compressing and working portions are supported on the lateral wall of the cylinder by bearings and rotate about their axis, the force of the compression gas or combustion gas is borne by said bearings and no torque is produced. Thereby, great force between vane and rotor can be prevented, which results in high durability.

2. Since compression and working are accomplished by two sets of structures provided on the same shaft, and the interior of eccentric rotors are communicated with each other, lubrication and cooling can easily be accomplished and reliability is increased.

3. Since the compressing portion and working portion are disposed separately, the ratio of working volumes can be defined easily and accurately, and the energy utilization is increased.

BRIEF DESCRIPTION OF THE DRAWINGS

The present invention is illustrated hereinafter by a detailed description of the preferred embodiment, which is presented in conjunction with, and by reference to, the accompanying drawings, in which like reference characters refer to like or corresponding parts, and wherein:

FIGS. 2a and 2b are a schematic view showing the working procedure of the working portion of the embodiment, wherein FIG. 2a shows the initial stage of the explosion/discharge stroke, and FIG. 2b shows the stage during the explosion/discharge stroke; and FIGS. 3a and 3b are a schematic view showing the working procedure of the compression portion of the embodiment, wherein FIG. 3a shows the finish stage of the compression/suction stroke, and FIG. 3b shows the stage during the compression/suction stroke.

DESCRIPTION OF THE PREFERRED EMBODIMENT

Figure 1:
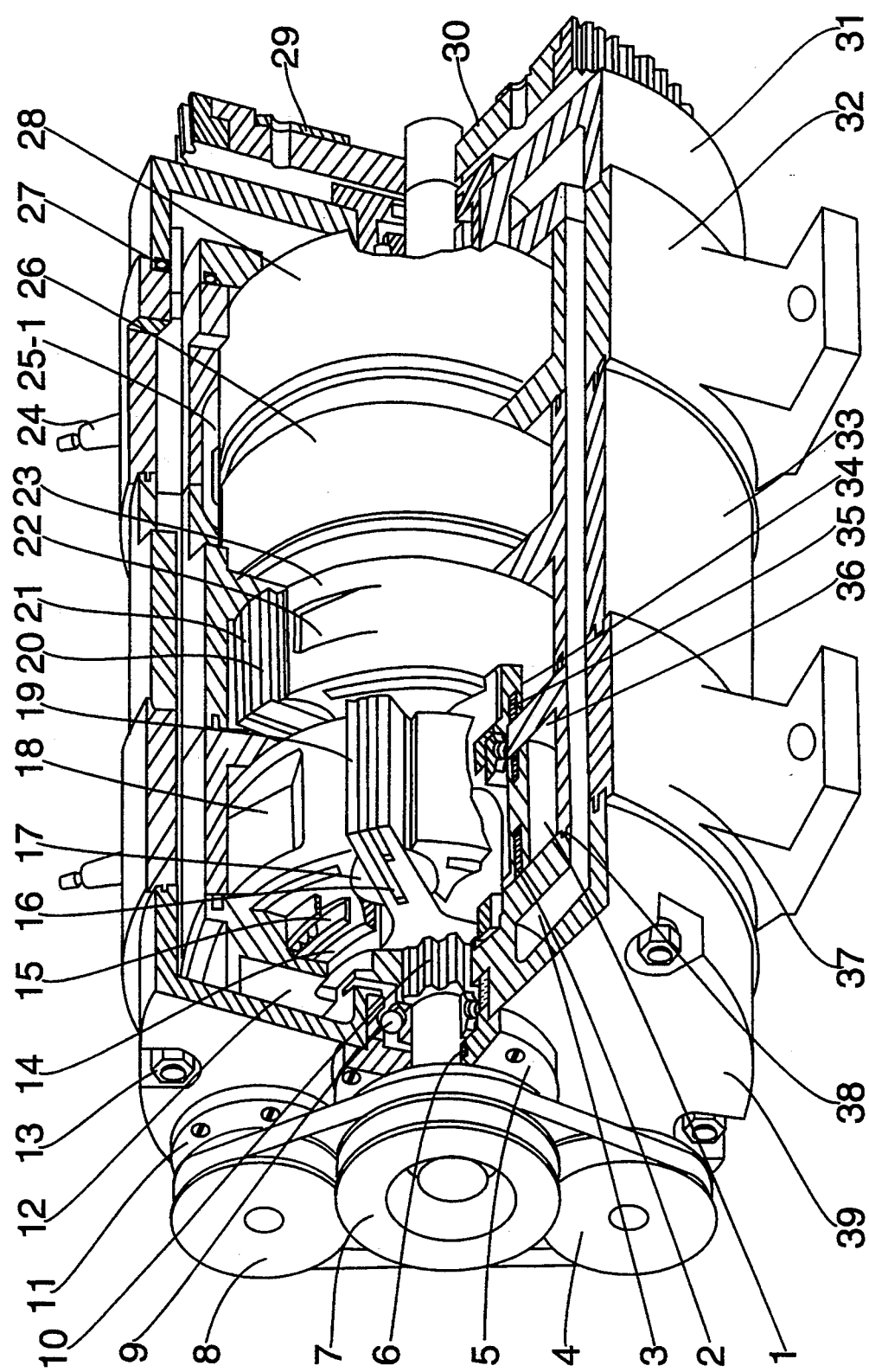
FIG. 1 is a schematic perspective view of an embodiment according to the invention.

As shown in FIG. 1, a double-cylinder, four-stroke combined rotary vane gasoline engine is formed in series by two sets of compressing portions and working portions, which are secured longitudinally together by bolts 13. For the sake of illustrating the invention more clearly, external apparatus such as the carburetor, inlet and outlet pipes, etc., are all omitted from the drawings.

Referring to FIG. 1, the compressing portion comprises a cylinder 33 with two cylindrical chambers, which are separated by a partition and each of which is provided with a hollow cylindrical eccentric rotor 23, 26 supported by a bearing 36. An output shaft 10 penetrates the center axis of the engine and is provided with a spline at the midsurface thereof, on which, at the portion corresponding with the cylinder, there is provided a vane 20 with key slots. Vane 20 is longitudinally provided at its top with sealing member 21. A grooved gas trough 22 is formed on the external wall of the eccentric rotors 23 and 26, respectively. The troughs 22, according to this embodiment, are wedge-like for receiving compressed gas. An annular sealing ring 35 is disposed on the side wall of each eccentric rotor and is pressed against the side wall of the cylinder by compressing spring 34. A pair of half-cylindrical slides 17, 46 are disposed at the opening of the rotor.

The working portion comprises two cylinders 32, 37 located at the two sides of the cylinders 33 of the compressing portion. A spark plug 24 is attached to the external wall of the cylinders 32, 37. Hollow cylindrical eccentric rotors 14, 28 are respectively disposed in the cylinders 32, 37. A vane 19 is provided in each of rotors 14, 28, which are respectively provided with a concave combustion chamber 18 on their external walls, and an annular sealing ring 2 on the side walls. The chamber 18 has a triangular cross section, and is formed in the rotor at the upstream side adjacent to the vane. The sealing ring 2 is pressed against the side wall of the cylinder 32, 37 by compression spring 1.

Rotors 14, 28 are supported on both the side walls of the cylinders and the walls of covers 31, 39, covering over the two ends of the engine, via bearings 15. Vane 19 is provided at its top with sealing member 16. A pair of half-cylindrical slides 17 are provided at the opening of the rotors 14, 28, i.e., at the interfacing region between the vane and the rotor. Output shaft 10 is supported on the covers 31, 39 via bearings 9, which are sealed by end caps 5 provided with "O" rings 6. The walls of their cylinders 32, 33, 37 in the working portion and the compressing portion are provided with internal gas passages 25 communicated with each other for introducing the compressed gas into combustion chambers 18.

Output shaft 10 is provided with a flywheel 30 with a friction disc 29 at one end, and pulley 7 at the other end for driving pulley 8 of oil pump 11 and pulley 4 of a water pump (not shown) so as to lubricate and cool the engine. The cylinders and the covers are all provided with cooling jackets 3 and lubricating circuits 12 and are sealed by "O" rings 27, 38.

Referring now to FIGS. 2a, 2b and 3a, 3b the working procedure of the working portions and the compressing portions of the rotary engine according to the invention is shown. The compressing cylinder 33 and the working cylinders 32, 37 are provided at their center with a shaft 10 with a spline for mounting vanes 20, 19 thereon. Two pairs of half-cylindrical slides 17, 46 can oscillate and are provided in the half-cylindrical slots formed at the two sides of the openings of the rotors 14, 23 to hold vanes 20, 19 at their sides and allow the vanes 20, 19 to slide therein. Longitudinal sealing members 40, 41 are provided in the half-cylindrical slots which are on the openings of the rotors, and opposite to the rotational direction of the opening.

An inlet 42 is provided at the circumferential wall of the compressing portion, and an exhaust outlet 43 is provided at the circumferential wall of the working portion. A series of oil holes 45 are circumferentially provided at the side wall of the rotor between the bearing holes of the rotor and the internal walls of the rotors for the passage of oil.

As shown in FIGS. 2a, 2b and 3a, 3b, the vanes 19, 20 and rotors 14, 23 rotate clockwise with the difference of angles α of vanes between compressing portion and working portion being 70°–9020. Said cylinders 33 and 37 are of cylindrical shape. Said key slot 10 is at the same axis with the shaft of cylinders 33 and 37 while the axes of rotors 14 and 23 are away from those of said cylinders 33 and 37. The external walls are in contact with the internal walls of cylinders 33 and 37, thus surrounding a space together with the internal walls of the cylinders. Said exhaust outlet 43 is provided at the downstream end in the direction of rotation in the said space of the working portion while said inlet 42 is provided at the upstream side in the direction of rotation in the above-mentioned space of the compressing portion. The section of the internal wall of the above-mentioned cylinder in contact with the rotor forms an identical arc in curvature to the external walls of rotors 14 and 334, and thereby form sealed areas, that is, rotors 14 and 23 are tangential to the internal walls of cylinders 33 and 37, and gas passage 25 is provided at that section of cylinder 37 adjacent to the downstream portion of gas passage 25, is attached spark plug 24 (or an injection nozzle) used in the ignition system, and the opening of the passage is formed at the sealing portion between the circumferential wall and the rotor.

Figure 2A:
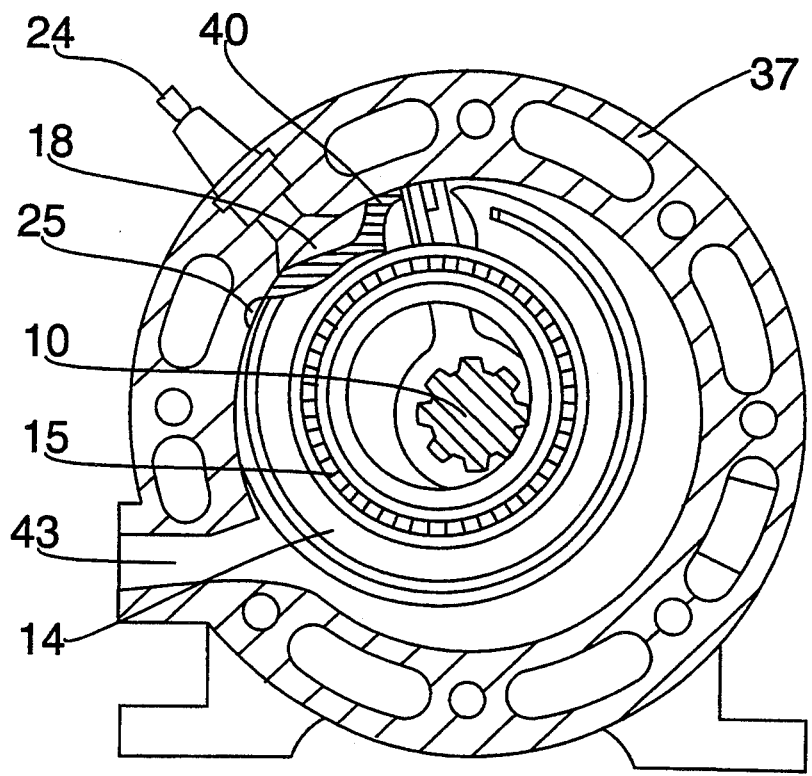

As shown in FIG. 2a, spark plug 24 is provided adjacent to the downstream side of the gas passage of each working portion, with the angle β between the gas passage and the spark plug being 10° to 20°. The concave combustion chamber 18 is provided at the upstream side (or left side) adjacent to the opening of the rotors 14 of the working portion so as to receive the compressed fuel-air gas mixture from the gas passage when the combustion chamber rotates to the position against the gas passage, or to close the passage by the external wall when the combustion chamber rotates to the position opposite to the spark plug to ignite.

Figure 3A:
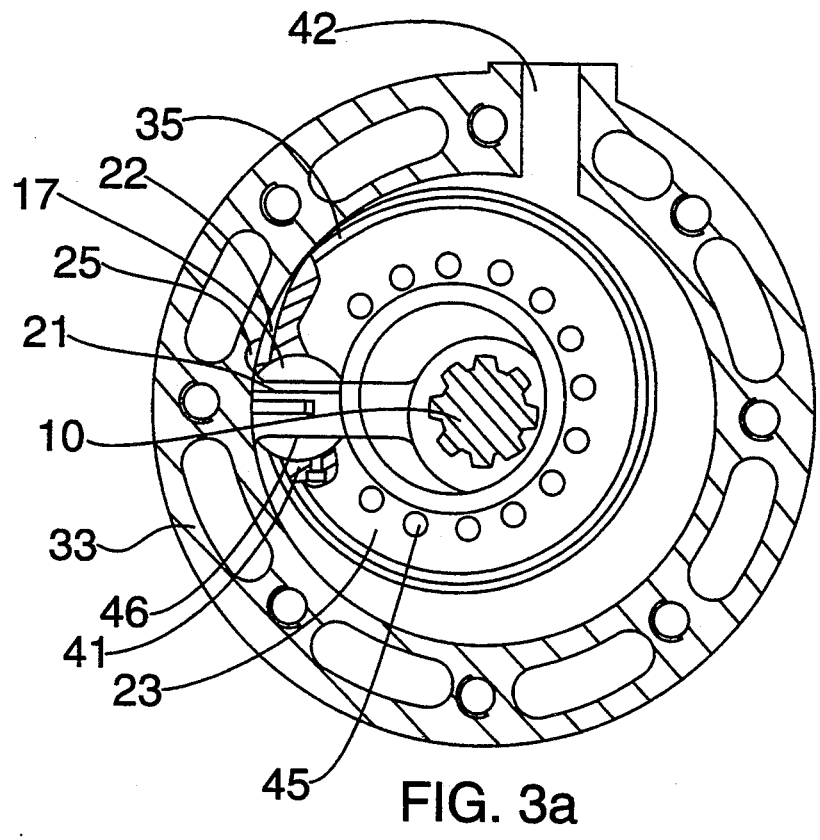
Figure 3B:
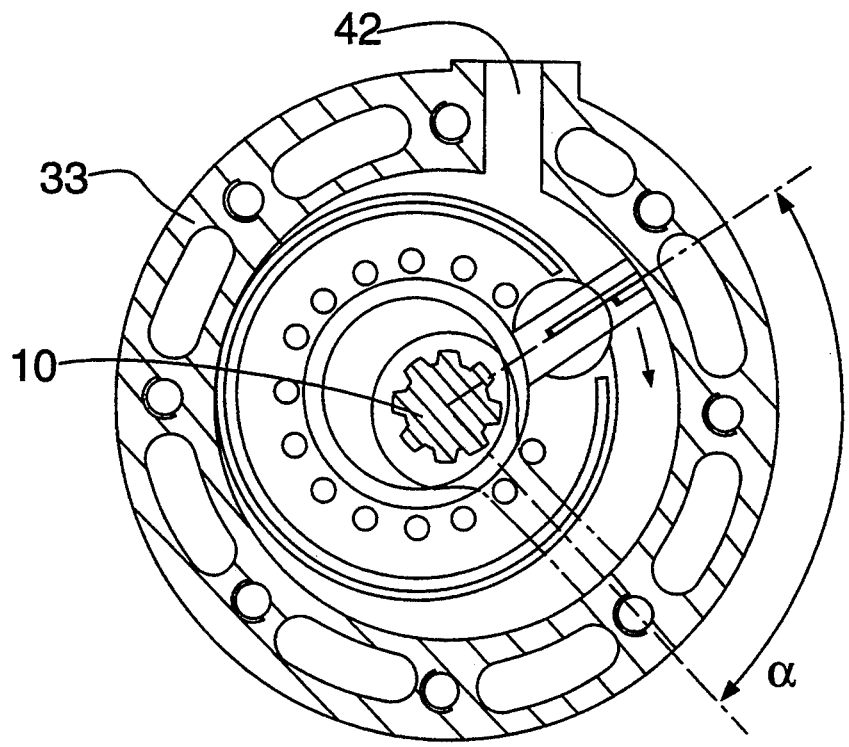

As shown in FIGS. 3a and 3b, the position of the gas passage of the compressing portion is similar to that of the working portion. A gas trough 22 is provided in the rotor of the compressing portion at the downstream side (or right side) adjacent to its opening for receiving compressed gas. The radial size of the cylinder, the rotor and the vanes are identical. The optimum working volume ratio of the compressing portion and the working portion is realized by their different longitudinal length. Therefore, the engine is easy to produce, and the volume ratio can easily be adjusted. Up to now, the optimum longitudinal length ratio has been 0.7:1.

The working procedure of the engine according to this invention is a follows: When starting, the output shaft 10 rotates for a revolution, to compress the sucked fuel-air gas mixture into the gas trough 22 by the vane of the compressing portion. When the gas trough 22 is aligned with the gas passage 25, the combustion chamber 18 of the working portion is also aligned with gas passage 25, so the gas mixture is introduced into combustion chamber 18. When combustion chamber 18 is rotated to align with the spark plug, the rotor 14 has closed the opening communicating gas passage 25 with the working portion, and at the same time, rotor 23 has closed the opening communicating gas passage 25 with the compressing portion. Therefore, after ignition the combustion gas pushes the vanes 19 forward to work and to discharge exhaust gas produced in the previous stroke, and to drive the compressing portion to perform a suction/compression stroke. Since the gas passage is closed by the two rotors at the same time (double sealing), the leak of combustion gas to the compression portion is effectively prevented, and the disk valve used in the prior art, which is complicated and has poor reliability, can be omitted. This is one of the obvious features of the present invention.

Figure 2B:
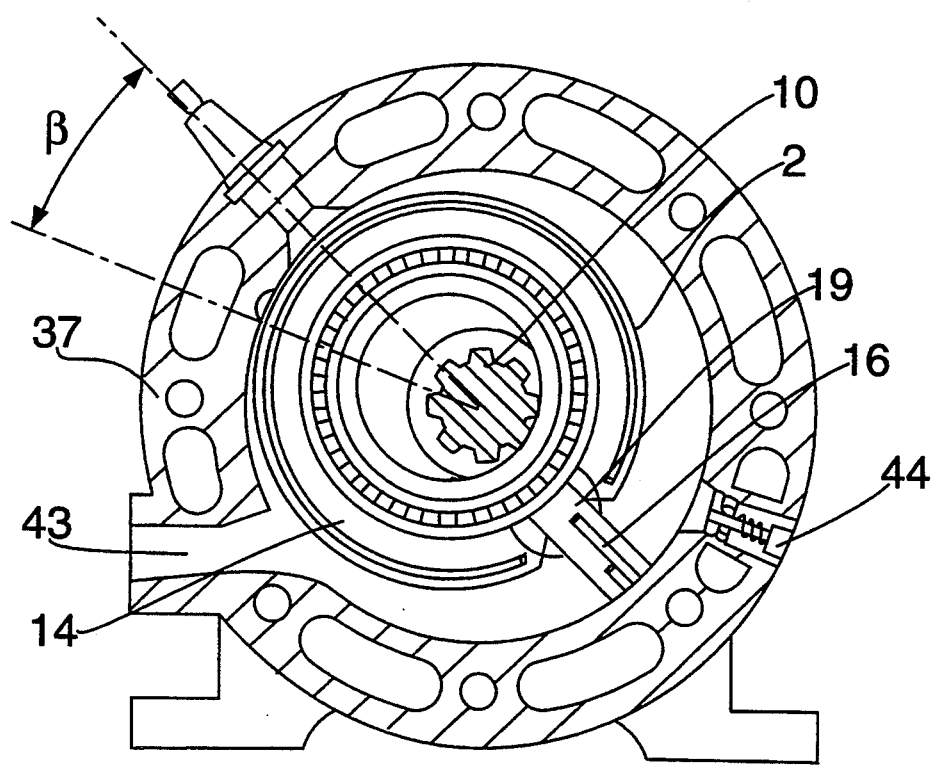

Furthermore, compressed gas does not exist in the gas passage at the starting, so that a negative pressure, which can cause difficult starting, may be produced in the operation chamber of the working portion during the first rotation. To overcome this starting difficulty, a check valve 44 may be provided on the wall of the cylinder of the working portion somewhere corresponding to the working chamber (such as at the right lower portion, as shown in FIG. 2b so as to suck air to eliminate the negative pressure produced in the chamber. The check valve may be a lift valve (similar to a valve in a conventional engine) which is pressed to a closed position by a spring.

From the preceding description of the preferred embodiment, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A combined rotary vane engine, comprising at least a compressing portion, at least a working portion and an ignition system, characterized in that:

A. said working portion comprises at least a cylinder, an output shaft disposed on an axis of said cylinder and extended to the compressing portion, a single vane secured on the output shaft and extended radially to the internal wall of said cylinder, a hollow cylindrical eccentric rotor located between said output shaft and said cylinder and biased relative to the axis of said cylinder and supported on the side wall of said cylinder by bearings and being rotatable about the axis of said rotor, the section of the internal wall of the said cylinder in contact with the rotor forms an arc which is identical to the external wall of the rotor and forms sealed areas, the cross-section which is provided at the said rotor adjacent to the upstream side of the vane is a triangular combustion chamber, the hollow cylindrical wall of the eccentric rotor being provided with a longitudinally extended opening for said vane to project out, a slide which allows said vane to reciprocate relative to said rotor being provided in the opening;

B. said compressing portion comprising at least a cylinder adjacent to and coaxial with the cylinder of said working portion, a single vane secured on the portion extended into said cylinder from the output shaft, and extended radially to the internal wall of said cylinder in said compressing portion, a hollow cylindrical eccentric rotor provided between the output shaft and said cylinder, and biased relative to the axis of said cylinder and supported on the side wall of said cylinder by bearings and being rotatable about the axis of said rotor, the section of the internal wall of the said cylinder in contact with the rotor forms an arc which is identical to the external wall of the rotor and forms sealed areas, the cross-section which is provided at the said rotor adjacent to the downstream side of the vane is a shallow wedge-like trough, the hollow cylindrical wall of the eccentric rotor being provided with a longitudinally extended opening for the vane to project out, a slide which allows said vane to reciprocate relative to said rotor being provided in he opening; and C. at the wall of the cylinder of the said working portion is installed an exhaust outlet which is interlinked with the end of the space surrounded by the cylinder and the rotor in the direction of rotation, the wall of the cylinder of the said compressing portion being provided with an inlet which is interlinked with the upstream side in the space surrounded by the cylinder and the rotor in the direction of rotation, an interlinked gas passage being installed along the adjacent walls of the cylinder in the sealed area formed by the cylinder and the rotor of the above two portions while a spark plug or an injection nozzle used in the ignition system of the engine is attached to the position adjacent to the downstream side in the direction of rotation inside the wall of the area sealed by the said rotor of the working portion.

2. The rotary engine as set forth in claim 1, wherein said slide is composed of a pair of oscillatable half-cylindrical bodies being disposed in a pair of half-cylindrical slots formed at the two side walls of the opening of the rotor so as to hold said vane at their sides and allow the vane to slide therein.

3. The rotary engine as set forth in claim 2, wherein said angle $\alpha$ between the vane of said compressing portion and the vane of said working portion is between 70° to 90°.

4. The rotary engine as set forth in claim 1, wherein the radial sizes of the working portion and the compressing portion are identical, and the longitudinal length ratio between the working portion and the compressing portion is 1:0.7.

5. The rotary engine as set forth in claim 1, wherein at the top of said vane there is an a sealing member, said side wall of the rotor being provided with an "O" ring and the half-cylindrical slot at the upstream of the opening of the rotor being provided with a sealing member for sealing between the slot and the half-cylindrical slide.

6. The rotary engine as set forth in claim 6, wherein on the wall of the cylinder of the working portion there is provided a check valve.

7. The rotary engine as set forth in claim 1, wherein said angle $\alpha$ between the vane of said compressing portion and the vane of said working portion is between 70° to 90°.

8. The rotary engine as set forth in claim 1, wherein the angle $\beta$ between the gas passage and the spark plug or injection nozzle is between 10° to 20°.

9. The rotary engine as set forth in claim 1, wherein on the wall of the cylinder of the working portion there is provided a check valve.

* * * * *